(No Model.)
J. R. HOFFMAN.
BAND SAW PULLEY.
No. 417,425. Patented Dec. 17, 1889.
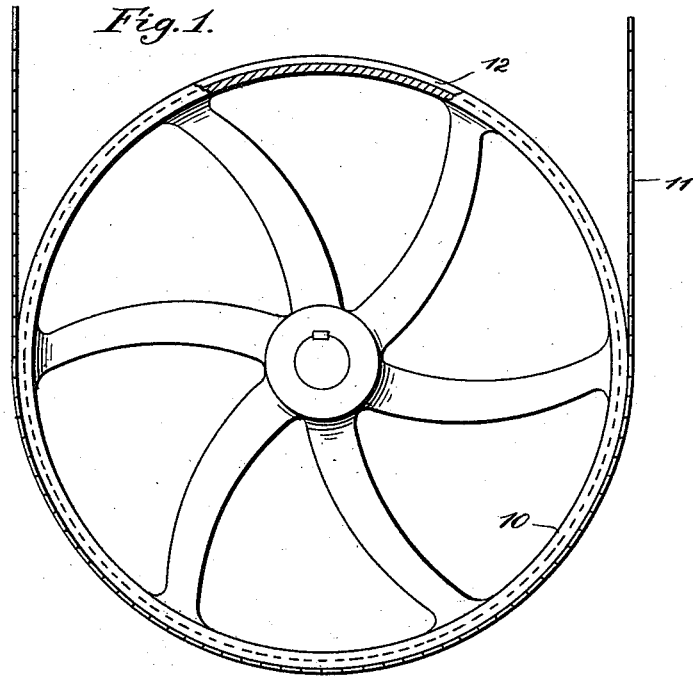
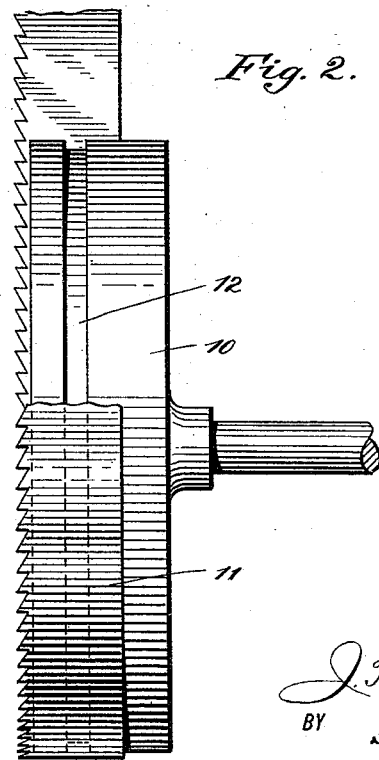
WITNESSES:
D. C. Reusch
C. Sedgwick
INVENTOR:
J. R. Hoffman
BY Munn & Co.
ATTORNEYS.

UNITED STATES PATENT OFFICE.

JACOB R. HOFFMAN, OF CHARLESTON, WEST VIRGINIA.

BAND-SAW PULLEY.

SPECIFICATION forming part of Letters Patent No. 417,425, dated December 17, 1889.

Application filed June 7, 1889. Serial No. 315,438. (No model.)

*To all whom it may concern:*

Be it known that I, JACOB R. HOFFMAN, of Charleston, in the county of Kanawha and State of West Virginia, have invented a new and useful Improvement in Band-Saw Pulleys, of which the following is a full, clear, and exact description.

My invention relates to an improvement in band-saw pulleys, and has for its object to provide a means whereby an equal tension will be obtained upon the front and back edge of the saw when passing over the pulley; and a further object of the invention is to obviate the necessity of hammering or rolling the saw in the middle in order to make the tension of both edges equal, as has heretofore been done, which tension is necessary to the successful running of a band-saw.

The invention consists in the novel construction and combination of the several parts, as will be hereinafter fully set forth, and pointed out in the claim.

Reference is to be had to the accompanying drawings, forming a part of this specification, in which similar figures of reference indicate corresponding parts in both the views.

Figure 1 is a side elevation of the pulley and edge view of the saw; and Fig. 2 is a front elevation of the pulley, the saw being partially broken away.

To secure the advantages above set forth I form in the periphery of the pulley 10, over which the saw 11 is to run, an annular recess or groove 12, the said groove or recess being located at a point upon the periphery of the wheel which will register, essentially, with the center of the saw when running upon the pulley. By thus grooving the periphery of the pulley the necessity for rolling or hammering the saw is obviated, as the strain is thrown upon each edge of the saw contacting with the peripheral face of the pulley by reason of the said saw being released from all strain or frictional contact at or near the center of the same.

When gumming a saw which has been made to travel upon a pulley like that described the saw does not spring around toward the back, as it does when it is treated in the old manner.

When a saw is used in connection with the improved pulley, it should be made perfectly straight, and it will remain so when employed in connection with this device, consequently lasting a long period without breaking.

By hammering or rolling the saw its entire length, as has heretofore been the custom, the saw is stretched more or less, which is greatly injurious to the blade, and renders it necessary to stretch the back of the saw every time it is gummed or ground out in order to lengthen the teeth. This device obviates that difficulty by leaving the saw straight and of the same width at every point; therefore gumming does not affect it. The groove or recess in the pulley is ordinarily made about an inch and an eighth deep; but the depth and the width of the recess may be varied according to the size of the pulley and the width of the saw employed.

Having thus described my invention, I claim as new and desire to secure by Letters Patent—

As an improved article of manufacture, a band-saw pulley provided with a rectangular peripheral groove, the said groove being at one side of the center of the pulley, whereby equal tension will be obtained upon the edges of the saw, and the teeth of the saw permitted to project beyond the pulley, as specified.

JACOB R. HOFFMAN.

Witnesses:
M. KAUFMANN,
C. C. RAND.